Patented Nov. 30, 1937

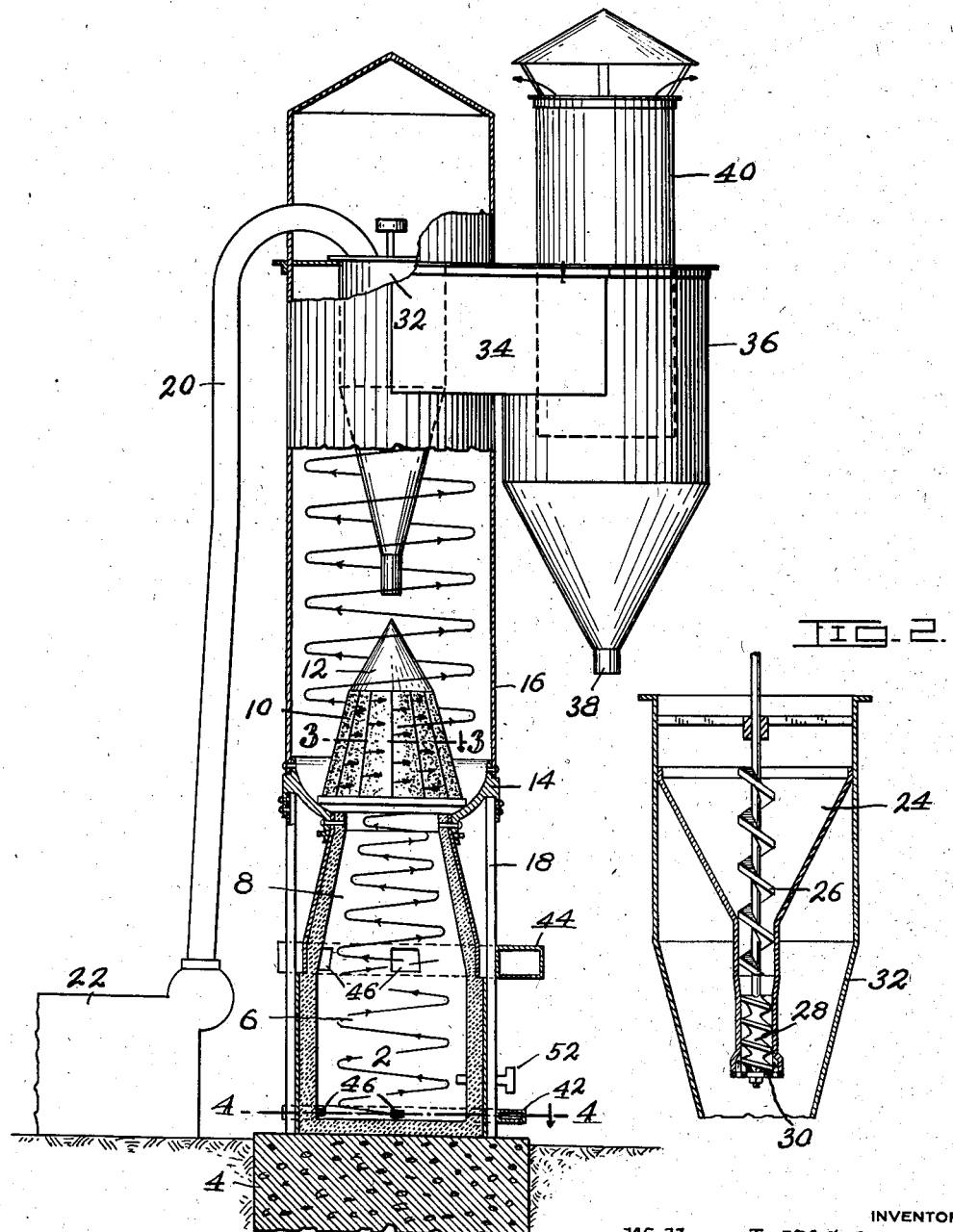

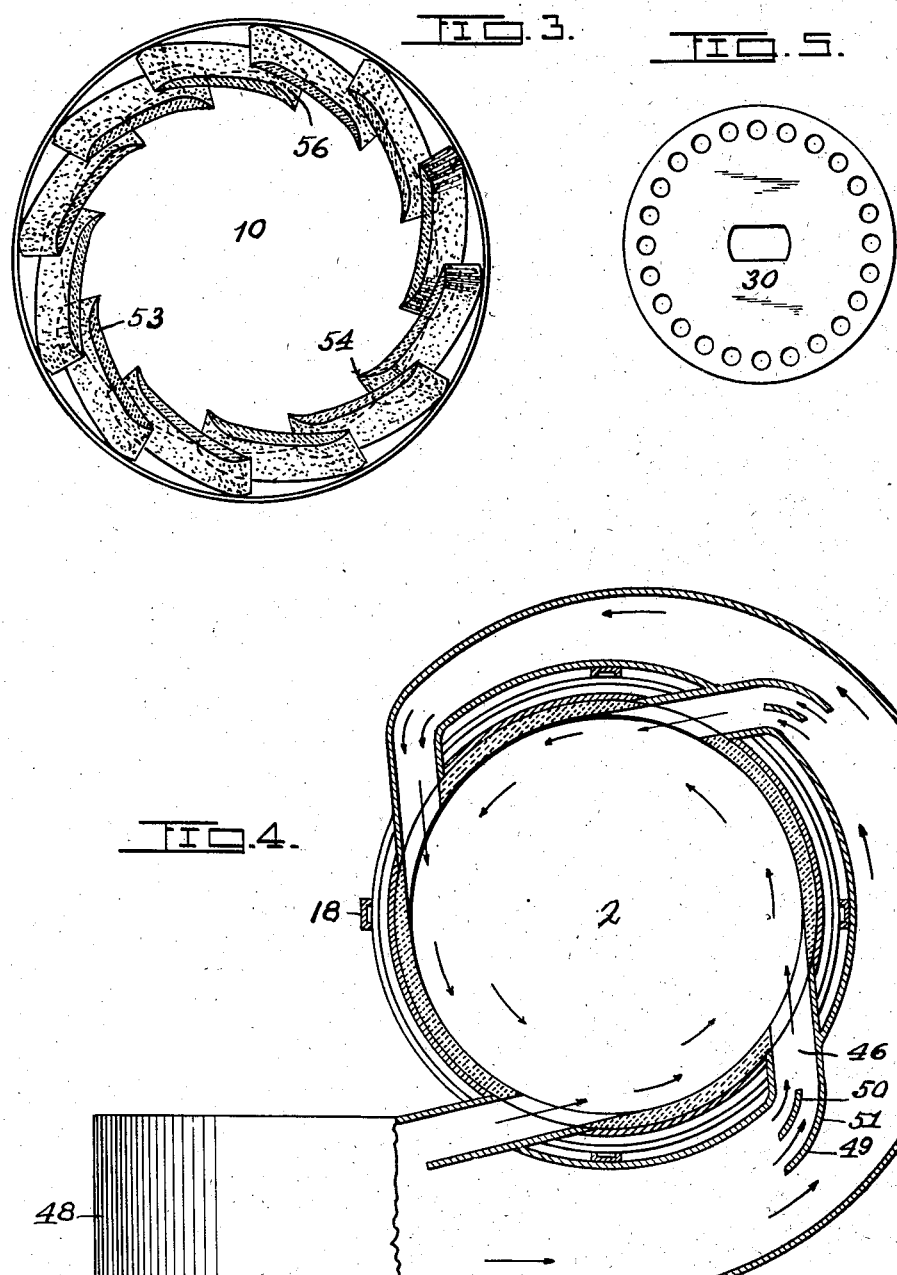

2,100,907

UNITED STATES PATENT OFFICE 2,100,907

APPARATUS FOR MANUFACTURING DRIED FEED

Wallace L. McGehee and Harold W. Luhnow, Kansas City, Mo.

Application January 20, 1936, Serial No. 59,935

15 Claims. (Cl. 34—34)

Our invention relates to the manufacture of readily digestible feed for poultry and livestock and it comprises an apparatus and method of making dry feeds from fresh fodder material, such as alfalfa, clover, soy beans, cow peas, etc., by treating the same in such manner as to retain a large percentage of the available proteins and the vitamins of the fresh cut material.

Grass, alfalfa, clover, cow peas, soy beans, etc., cut at the ordinary hay making stage are considerably more nutritious than the corresponding hay, in that the proteids and carbohydrates are more available. When alfalfa is at the hay making stage, the leaves constitute about 40 to 60 per cent of the weight and they contain approximately four-fifths of the protein of the whole plant, but when the cut alfalfa is left in the field to cure the leaves become dry and brittle and the loss by shattering is considerable. Rain and dew also may extract much of the valuable constituents, while losses by leaching may be as high as 40 per cent of the material. In both instances, the loss represents the most valuable portion of the material and reduces the digestibility and palatability of the finished product.

One of the purposes of the present invention is to produce a dehydrated alfalfa having approximately the original composition existing in the green alfalfa, and avoid loss by shattering, leaching, or detrimental changes in the contained enzymes, vitamins, proteids and carbohydrates.

While we regard our method as more particularly applicable to alfalfa, yet as a method it may be applied to other green feeds, such as grass, clover, soy beans, cow peas, etc. In the case of other leguminous feeds, it has much the value it has with alfalfa and for similar reasons. We shall, however, hereinafter describe our method more particularly as applied to alfalfa.

In the present method, alfalfa or other green feed material is harvested in the customary way at the usual hay making stage and is cut into short pieces before any drying takes place, thereby avoiding the ordinary losses by shattering of leaves. If desired the short pieces may be further reduced in size. In drying, the water is removed comparatively slowly by evaporation into humid atmospheres, thereby avoiding undesirable changes in unripe forms of cellulose, starch, or other constituents, as well as changes in available proteids and in such delicate constituents as the vitamins.

In the accompanying drawings which show more or less diagrammatically a preferred form of apparatus capable of use in the production of the described product:—

Fig. 1 is a vertical sectional view, partly in elevation, of approximately the complete apparatus.

Fig. 2 is a vertical sectional view of a grinder whereby the product may be reduced to any desired degree of fineness.

Fig. 3 is an enlarged cross sectional view on line 3—3 of Fig. 1.

Fig. 4 is an enlarged cross sectional view on line 4—4 of Fig. 1.

Fig. 5 is a detail of one of the interchangeable blades of a grinder shown by Fig. 2.

In the structure shown by Fig. 1, 2 designates a vertically-disposed furnace resting upon a concrete or other suitable foundation 4. The furnace 2 is divided into a combustion chamber 6, and a mixing chamber 8 surmounted by a stationary multi-bladed hot air distributor 10 communicating at its lower open end with the mixing chamber 8 and closed at its upper end by a conical top 12.

The upper end of the mixing chamber 8 is equipped with an annular member 14 which is assisted in supporting the hot air distributer 10 and a dehydrating chamber 16, by means of standards 18 extending upwardly from the foundation 4. The dehydrating chamber 16 is vertically disposed upon the annular member 14 in axial alinement with the furnace 2 and adapted to receive the green fodder at its upper portion through a pipe 20 leading upwardly from a silage cutter and blower 22. The pipe 20 discharges the green fodder into a hopper 24 equipped with an axially mounted screw conveyer 26 which carries the green fodder down to a grinder 28 having interchangeable blades 30 to enable the fodder to be reduced to the desired degree of fineness.

The hopper 24 and the grinder 28 are axially-disposed within a duct 32 which in turn is axially-disposed in the dehydrating chamber 16 in the upper portion of which it is suitably supported. The duct 32 tapers towards its lower end which terminates a short distance above the apex of the conical top 12. It may not be desirable to reduce some feeds further after passing them through the silage cutter 22, in which event the conveyer 26 and the grinder 28 may be removed from the duct 32.

The upper portion of the dehydrating chamber 16 communicates through a duct 34 with a pneumatic separator 36, preferably of the cyclone type, having an outlet 38 at its lower end through which the finished product is discharged, and an air stack 40 at its upper portion through which the moist waste gases escape to atmosphere.

In order to obtain a large volume of air to support combustion and for utilization in drying the green feed, we provide a primary air duct 42 near the bottom of the furnace 2, and a secondary air duct 44 located about midway between the top and bottom of said furnace. Each air duct is of segmental form and extends about three-fourths of the way around the exterior portion of the furnace 2 with the interior of which it communicates through a suitable number of equally spaced outlets 46.

The outlets 46 are arranged on a tangent with the inner surface of the furnace 2 as best shown by Fig. 4, to impart a whirling action to the air received from a blower 48 and discharged into the furnace 2 through said outlets 46. To insure that approximately equal volumes of air may be discharged through the outlets 46 a number of the same are provided with deflectors 49 for deflecting air thereinto from the respective air ducts. The outlets 46 provided with the deflectors 49 are also equipped with partitions 50 to divide the air and thereby prevent undue friction which would otherwise result if all of the air entering the outlets were permitted to impinge against the curved portion 51 of said deflectors 49. The air when discharged into the furnace 2 is heated to the desired temperature with suitable fuel such as gas or oil discharged from a burner 52 located at the lower portion of the furnace.

The distributor 10, which is arranged vertically above the furnace 2, comprises a multiplicity of blades 53 arranged approximately on a tangent to a circle intersecting their inner ends 54. The blades 53 taper towards their upper ends and are spaced apart to leave openings 56 arranged to discharge the hot air with the same whirling motion imparted thereto when discharged from the tangentially-disposed outlets 46 leading into the furnace 2.

In the operation of the apparatus, alfalfa or other green feed material fresh from the field is cut into lengths of from one to three inches with the silage cutter 22 and then blown therefrom to the upper portion of the dehydrating chamber 16 through the pipe 20 which discharges it into the hopper 24. It is then forced downwardly by the screw conveyer 26 to the grinder 28 where it is reduced to the desired fineness and discharged by the duct 32 upon the conical top 12 which distributes it outwardly in approximately a uniform manner in the lower portion of the dehydrating chamber 16. The distributed material is spread outwardly in a comparatively thin layer so that all particles thereof come into intimate contact with the hot air which absorbs moisture therefrom and conveys the ground feed upwardly in a helical path about the vertical axis of the dehydrating chamber 16 to the pneumatic separator 36, from which the humid air escapes through the stack 40 while the finished product is discharged from the outlet 38. As the hot air passes upwardly through the dehydrating chamber 16 it circulates around the duct 32 and thereby preheats the material descending therethrough and hastens the drying process to that extent.

Temperatures of the hot air may range from 250 to as high as 1600 degrees F., it depending somewhat on the character and moisture content of the material being dried and the speed at which it is run through the dehydrating chamber 16. The higher the temperature the more rapid will be the upward circulation of the hot moist air so that the material will be carried out of the dehydrating chamber 16 before it can become damaged by the higher temperatures.

The outer air on being discharged into the furnace 2 through the primary air duct 42 is heated to a high temperature by the hot products of combustion and as it ascends through the furnace 2 its volume is increased and temperature decreased by additional hot air supplied through the secondary air duct 44. Thus by the time the hot air enters the dehydrating chamber 16 its temperature has been reduced to such extent as to avoid bringing about undesirable changes in the available proteids and in such delicate constituents as the vitamins or enzymes, but is sufficient to dry the feed during the long travel over the helical path pursued from the lower to the upper portion of the dehydrating chamber 16.

As some of the particles will be separated from each other while others will be grouped together to a greater or less extent, it is apparent that the separated particles will become dried in less time and would therefor become damaged more or less if held back by baffles or other mechanical obstructions in the dehydrating chamber 16, but as they have a clear passageway it is apparent that they will, on becoming dried, be carried by the hot air from the dehydrating chamber ahead of the grouped particles which are retarded due to their greater specific gravity, thus a finished product of uniform quality is insured.

Green fodder materials which may be successfully treated with our method and apparatus comprise clover, alfalfa, timothy, corn stalks, and the tops and leaves of soy beans, cow peas, and the like.

While we have shown one form of apparatus for carrying out our method we reserve all rights to such other forms and modifications thereof as properly fall within the spirit and scope of the invention as claimed.

Having thus described our invention, what we claim and desire to secure by Letters Patent, is:

1. In an apparatus of the character described, a vertically-disposed furnace, a burner in the furnace, an air duct having an outlet communicating with said furnace and arranged at a tangent to the inner surface of the latter, a dehydrating chamber arranged axially above and communicating at its lower end with said furnace to serve as a flue for the furnace, baffles at the zone of connection between said furnace and said dehydrating chamber, and means for discharging green feed material into said dehydrating chamber.

2. In an apparatus of the character described, a vertically-disposed furnace, a burner in the furnace, an air duct extending partly around said furnace and provided with a plurality of outlets communicating with said furnace and arranged at a tangent to the inner surface of the latter, a dehydrating chamber arranged axially above and communicating at its lower end with said furnace, baffles at the zone of connection between said furnace and said dehydrating chamber, and means for discharging green feed material into said dehydrating chamber, said air duct serving to supply air to support combustion and to impart whirling motion to hot air and products of combustion passing upwardly through the chamber.

3. In an apparatus of the character described, a vertically-disposed furnace, a burner in the furnace, a primary air duct having an outlet communicating with the lower portion of said furnace and arranged at a tangent to the inner surface thereof, a secondary air duct spaced above said primary air duct having an outlet communicating with the furnace and arranged at a tangent to the inner surface thereof, a dehydrating chamber arranged axially above and communicating at its lower end with said furnace, and means for discharging green feed material into said dehydrating chamber, said burner being between the primary and secondary air ducts.

4. In an apparatus of the character described, a vertically-disposed dehydrating chamber, a stationary distributor, formed of a plurality of spaced apart blades axially arranged within said dehydrating chamber and provided with a conical top, a duct axially-disposed within the dehydrator and adapted to discharge green feed downwardly upon said conical top to be spread thereby, and means for forcing heated air upwardly between the blades of said distributor to dry the feed.

5. In an apparatus of the character described, a furnace, a burner in the furnace, a dehydrating chamber arranged immediately axially above and communicating at its lower end with said furnace, a supply pipe extending into the dehydrating chamber at the top thereof for delivering green feed material thereto, means arranged axially within the dehydrating chamber for conducting the material downwardly to a suitable point adjacent the zone of connection between the furnace and said chamber, and means for supplying the furnace with a large volume of air under pressure to be heated, said means directing the heated air upwardly in a helical path about the vertical axis of the dehydrating chamber to dry the green feed material and with sufficient force to convey it upwardly through said dehydrating chamber with the products of combustion from the burner.

6. In an apparatus of the character described, a furnace, a burner in the furnace, a dehydrating chamber arranged immediately axially above and communicating at its lower end with said furnace, a supply pipe at the top of the dehydrating chamber for delivering green feed material thereto, a duct arranged within the dehydrating chamber for conducting the material downwardly to a suitable point in desired proximity to the burner, and means for supplying the furnace with air to be heated and circulated through the dehydrating chamber to dry and convey the feed material therefrom with the products of combustion.

7. In an apparatus of the character described, a furnace, a burner in the furnace, a dehydrating chamber communicating with said furnace to receive hot air and products of combustion therefrom, means for delivering green feed material into the upper portion of said dehydrating chamber, a duct arranged within the dehydrating chamber for directing the material downwardly toward the burner, and baffles within the dehydrating chamber for spreading the downwardly directed material into the path of the hot air and precluding its entrance into the furnace, said means being above the burner and maintained hot thereby.

8. In an apparatus of the character described, a vertically disposed dehydrating chamber, a furnace having a burner therein forming the bottom portion of the chamber, means for delivering green feed into the upper portion of said dehydrating chamber, means for directing the material downwardly, conical, perforated means forming a partition between upper and lower portions of the chamber for spreading the downwardly directed material, and means for circulating air upwardly through first the furnace portion then the upper portion of the dehydrating chamber to dry the material.

9. In an apparatus of the character described, a vertically disposed dehydrating chamber, a furnace below the chamber in downward continuation thereof and in communication therewith, a burner in the furnace, a duct adapted to discharge green feed into the dehydrating chamber, a stack and separator in communication with the upper end of the dehydrating chamber, and baffles at the zone of connection between the furnace and dehydrating chamber, formed to direct air and the products of combustion through spiral paths as they travel upwardly toward the stack and to prevent entrance of the feed into the furnace.

10. In an apparatus of the character described, a vertically disposed dehydrating chamber, a furnace below the chamber in downward continuation thereof and in communication therewith, a burner in the furnace, a duct adapted to discharge green feed into the dehydrating chamber, a stack and separator in communication with the upper end of the dehydrating chamber, ducts in communication with the furnace to provide air to support combustion, and a distributor at the zone of connection between the furnace and the dehydrating chamber formed to direct the products of combustion through spiral paths as they travel upwardly toward the stack from the distributor and to prevent entrance of the feed into the furnace, said last mentioned ducts being arranged to direct air into the furnace along spiral paths extending upwardly toward the distributor when the burner is in operation.

11. In an apparatus of the character described, a vertically disposed dehydrating chamber, a furnace below the chamber in downward continuation thereof and in communication therewith, a burner in the furnace, a duct adapted to discharge green feed into the dehydrating chamber, a stack and separator in communication with the upper end of the dehydrating chamber, ducts in communication with the furnace to provide air to support combustion, and a distributor at the zone of connection between the furnace and the dehydrating chamber formed to direct the products of combustion through spiral paths as they travel upwardly toward the stack from the distributor and to prevent entrance of the feed into the furnace, said last mentioned ducts being arranged to direct air into the furnace along spiral paths extending upwardly toward the distributor when the burner is in operation, said discharge duct for the green feed terminating above the distributor on the axis of the dehydrating chamber whereby pieces of green feed are caused to fall by gravity onto the distributor to be dried by contact therewith while pieces of green feed of relatively lighter weights are entrained in the air and products of combustion traveling upwardly through the said chamber.

12. In an apparatus of the character described, a vertically disposed dehydrating chamber, a furnace below the chamber in downward continuation thereof and in communication therewith, a burner in the furnace, a duct adapted to discharge green feed into the dehydrating chamber, a stack and separator in communication with the upper end of the dehydrating chamber, ducts in communication with the furnace to provide air to support combustion, and a distributor at the zone of connection between the furnace and the dehydrating chamber formed to direct the products of combustion through spiral paths as they travel upwardly toward the stack from the distributor and to prevent entrance of the feed into the furnace, said last mentioned ducts being arranged to direct air into the furnace along spiral paths extending upwardly toward the distributor when the burner is in operation, said discharge duct for the green feed terminating above the distributor on the axis of the dehydrating chamber whereby pieces of green feed are caused to fall by gravity onto the distributor to be dried by contact therewith while pieces of green feed of relatively lighter weights are entrained in the air and products of combustion traveling upwardly through the said chamber, said distributor having a portion thereof adjacent the discharge duct formed to spread the green feed as it falls from the duct.

13. In an apparatus of the character described, a vertically disposed dehydrating chamber, a furnace below the chamber in downward continuation thereof and in communication therewith, a burner in the furnace, a duct adapted to discharge green feed into the dehydrating chamber, a stack and separator in communication with the upper end of the dehydrating chamber, ducts in communication with the furnace to provide air to support combustion, and a distributor at the zone of connection between the furnace and the dehydrating chamber formed to direct the products of combustion through spiral paths as they travel upwardly toward the stack from the distributor and to prevent entrance of the feed into the furnace, said last mentioned ducts being arranged to direct air into the furnace along spiral paths extending upwardly toward the distributor when the burner is in operation, the products of combustion and heat from said burner serving to maintain the distributor at a relatively high temperature compared to the atmospheric temperature.

14. In an apparatus of the character described, a vertically disposed dehydrating chamber, a furnace below the chamber in downward continuation thereof and in communication therewith, a burner in the furnace, a duct adapted to discharge green feed into the dehydrating chamber, a stack and separator in communication with the upper end of the dehydrating chamber, ducts in communication with the furnace to provide air to support combustion, and a distributor at the zone of connection between the furnace and the dehydrating chamber formed to direct the products of combustion through spiral paths as they travel upwardly toward the stack from the distributor and to prevent entrance of the feed into the furnace, said last mentioned ducts being arranged to direct air into the furnace along spiral paths extending upwardly toward the distributor when the burner is in operation, said discharge duct for the green feed terminating above the distributor on the axis of the dehydrating chamber whereby pieces of green feed are caused to fall by gravity onto the distributor to be dried by contact therewith while pieces of green feed of relatively lighter weights are entrained in the air and products of combustion traveling through the said chamber, said distributor being provided with openings therethrough and a plurality of spirally arranged blades for the purpose specified.

15. In an apparatus of the character described, a vertically disposed dehydrating chamber, a furnace below the chamber in downward continuation thereof and in communication therewith, a burner in the furnace, a duct adapted to discharge green feed into the dehydrating chamber, a stack and separator in communication with the upper end of the dehydrating chamber, and a distributor at the zone of connection between the furnace and dehydrating chamber, formed to direct air and the products of combustion through spiral paths as they travel upwardly toward the stack and to prevent entrance of the feed into the furnace, said duct having a length thereof extending downwardly from the top of the dehydrating chamber through the upwardly traveling air and products of combustion to heat the green feed prior to its entrance into the chamber.

WALLACE L. McGEHEE.
HAROLD W. LUHNOW.